Figures 1, 2:
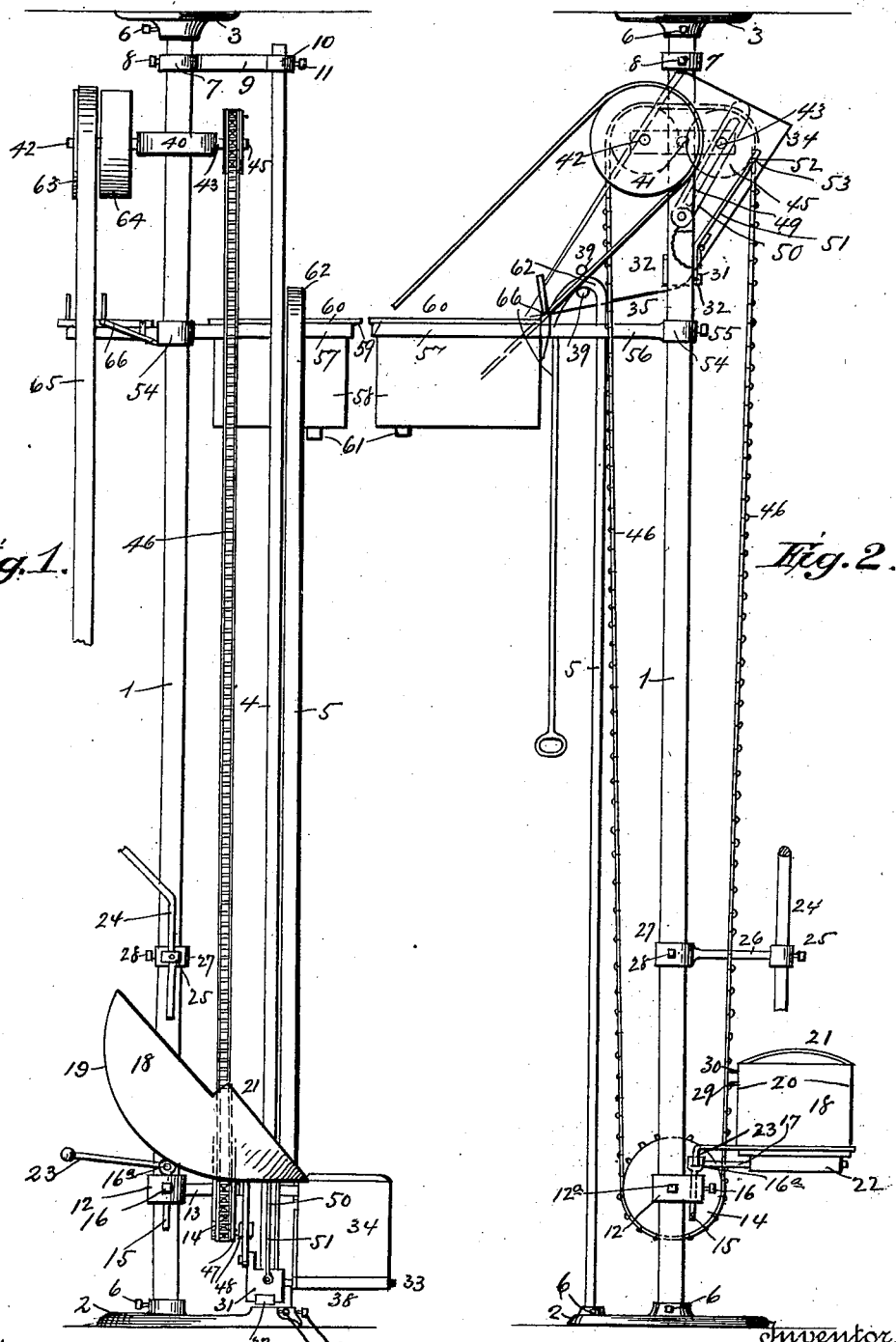

No. 710,280. Patented Sept. 30, 1902.
A. P. LAURSEN.
CREAM ELEVATOR.
(Application filed Apr. 2, 1902.)
(No Model.) 2 Sheets—Sheet 1.

Witnesses:
F. L. Durand
[signature]

Inventor:
Anders P. Laursen,
By Wm Bagger,
Attorney

No. 710,280. Patented Sept. 30, 1902.
A. P. LAURSEN.
CREAM ELEVATOR.
(Application filed Apr. 2, 1902.)
(No Model.) 2 Sheets—Sheet 2.
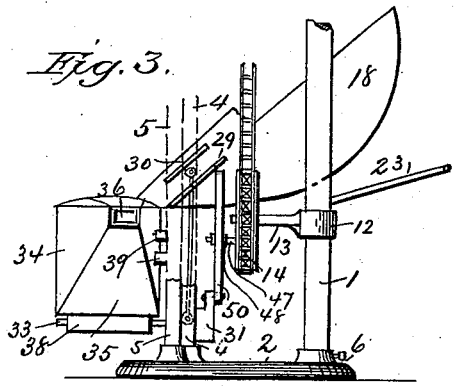
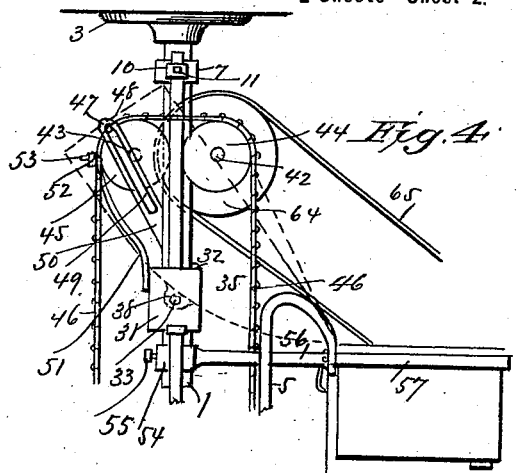
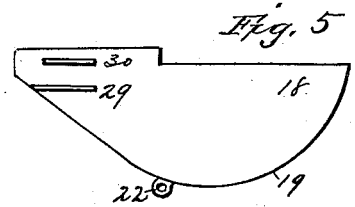
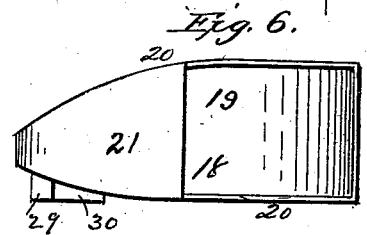
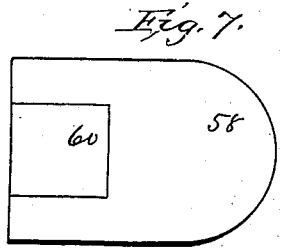
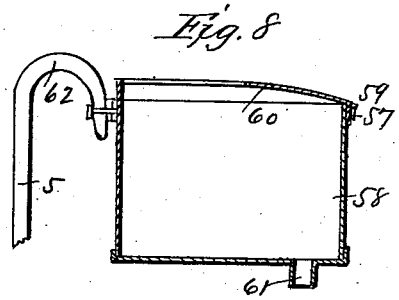
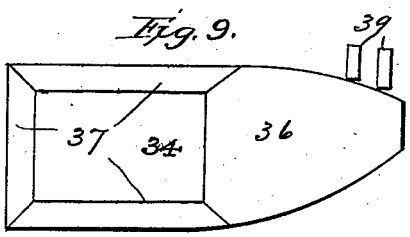
Witnesses:
Inventor:
Anders P. Laursen
By Wm Bagger,
Attorney.

UNITED STATES PATENT OFFICE.

ANDERS P. LAURSEN, OF CENTERPOINT, SOUTH DAKOTA.

CREAM-ELEVATOR.

SPECIFICATION forming part of Letters Patent No. 710,280, dated September 30, 1902.

Application filed April 2, 1902. Serial No. 101,081. (No model.)

*To all whom it may concern:*

Be it known that I, ANDERS P. LAURSEN, a subject of the King of Denmark, residing at Centerpoint, in the county of Turner and State of South Dakota, have invented certain new and useful Improvements in Cream-Elevators, of which the following is a specification, reference being had therein to the accompanying drawings.

This invention relates to that class of cream-elevators in which a vertically-reciprocating bucket or carrier receives the cream from a tank or vessel, which in turn receives it from the separator and discharges it into a tank located at an elevation, from which it may be distributed by gravity to the pasteurizer, sterilizing apparatus, cooler, or other point of destination; and it has for its object to provide a device of this class possessing superior advantages in point of simplicity, durability, ease and certainty of operation, and general efficiency.

With these ends in view the invention consists in the improved construction, arrangement, and combination of parts, which will be hereinafter fully described, and particularly pointed out in the claims.

In the drawings hereto annexed, Figure 1 is a front elevation of a cream-elevator constructed in accordance with my invention, showing the carrier or elevator-bucket in position to receive the contents of the lower tank. Fig. 2 is a side elevation showing the carrier in position to discharge its contents into the upper tank. Fig. 3 is a rear view of the lower part of the device, showing the parts in the same relative position as in Fig. 1. Fig. 4 is a side elevation of the upper part of the device, taken from the opposite side from that shown in Fig. 2 and showing the parts in the same relative position, the elevator-bucket, however, being indicated in dotted lines only. Fig. 5 is a rear view of the lower tank. Fig. 6 is a plan view of the same. Fig. 7 is a plan view of the discharge-tank. Fig. 8 is a sectional view taken vertically through the latter, its supporting-band, and the upper end of the guide-bar. Fig. 9 is a plan view of the elevator-bucket.

Corresponding parts in the several figures are indicated by like numerals of reference.

1 designates an upright or supporting column, the ends of which are seated in sockets formed for their reception in castings 2 and 3, which are to be secured, respectively, to the floor and ceiling of the room in which the apparatus is to be located. The lower casting 2 is also provided with sockets to receive the lower ends of the track-bar 4 and guide-rod 5, which may be secured in said sockets by means of set-screws 6.

Upon the column 1, near its upper end, is fitted a sleeve or band 7, secured by a set-screw 8 and having a laterally-extending arm 9, the outer end of which has a socket 10, in which the upper end of the track-bar 4 is secured by a set-screw 11. Upon the column 1, near its lower end, is arranged a sleeve 12, secured by a set-screw $12^a$ and having an arm or shaft 13 extending laterally in the direction of the track-bar and upon the outer end of which is journaled a sprocket-wheel 14. The front side of the sleeve 12 is perforated vertically for the passage of a rod 15, vertically adjustable and capable of being held in any position to which it may be adjusted by means of a set-screw 16. The upper end of the rod 15 has a head $16^a$, from which an arm 17 projects in a forward direction, as shown. Upon this arm 17 is mounted the tilting receiving-tank 18, the bottom of which, 19, is curved or rocker-shaped, as shown, and the sides of which, 20, converge toward its discharge end, which may be described as terminating in a spout formed by the converging sides and bottom in conjunction with a cover 21, which extends over about one-half the length of the tank at its discharge end. Transversely across the bottom of the tank is soldered or otherwise secured a tubular sleeve 22, journaled on the arm 17, upon which the tank is thus tiltingly mounted. The tank should be almost evenly balanced on its support, the excess of weight being in favor of its receiving end, which is normally supported upon an L-shaped arm or bracket 23, extending from the head $16^a$ of the vertically-adjustable rod 15. The tank 18 receives the cream from the separator through a tube 24, a support for which is provided in a band 25 at the outer end of an arm 26, projecting from a sleeve 27, which is secured upon the column 1 by a set-screw 28.

Upon the rear side of the tank 18, near its discharge end, are secured two flanges 29 30, the lower one of which, 29, is longer than the upper one, beyond which it extends in the direction of the discharge end of the tank. These flanges are acted upon for the purpose of tilting the tank, so as to discharge its contents and restoring it to its normal position by means which will be hereinafter described.

Upon the track-bar 4 is mounted a vertically-sliding carrier 31, consisting of a suitably-constructed casing, at the upper and lower corners of which are journaled rollers 32, bearing upon the track-bar, so as to lessen the friction in operation. The carrier 31 has a laterally-extending arm or shaft 33, which supports the tilting elevator-bucket 34. The bottom 35 of the latter is curved upwardly at the discharge end, in the direction of which its sides are also made to converge, so as to form, in conjunction with the top or cover 36, which extends over about one-half of the bucket at the discharge end of the latter, a spout through which its contents may be discharged into the tank or vessel provided for its reception, as will be presently described. That portion of the bucket over which the cover does not extend is provided at its upper edge with an inwardly-extending flange 37, extending entirely around said edge except at the point of contact with the discharge end of the tank 18 when the latter is tilted to discharge its contents into the bucket, the object of said flange being to prevent the cream from splashing over. Transversely across the bottom of the bucket 34 is soldered or otherwise secured a tube 38, by means of which the said bucket is mounted tiltingly upon its supporting-arm 33. To hold the said bucket, the discharge end of which, especially when loaded, is much the lightest, in an approximately level position while receiving its load and while being elevated, it is provided on the side facing the track-bar 4 with a pair of rollers 39 39, journaled upon pins extending from the side of the bucket and arranged diagonally across from each other to engage the front and rear sides of the guide-rod 5. The rear roller, by which is meant the one nearest the discharge end of the bucket, is placed below the level of the one on the opposite side of the guide-bar and is the one which receives the strain and supports the excess of weight in the front end of the bucket, the function of the roller on the opposite side of the guide-bar being practically limited to that of a guide-roller. The method of accomplishing the tilting of the bucket for the purpose of discharging its contents will be presently described.

Upon the column 1, near its upper end, is placed a sleeve or casting 40, held securely by means of a set-screw 41, which permits the vertical adjustment of the said casting. The latter is provided on opposite sides, in front and in rear of the column 1, with a pair of shafts, one of which, 42, must be revoluble in its bearings, while the other, 43, may be simply in the nature of a pin extending laterally from the casting 40 parallel to the shaft 42. Upon the latter is securely mounted a sprocket-wheel 44, and a similar sprocket-wheel 45 is journaled upon the pin 43. A chain 46 passes over the sprocket-wheels 44, 45, and 14, which latter is journaled near the lower end of the supporting-column, as has been already described. One of the links of the endless chain 46 is provided with a laterally-extending pin 47, upon which is journaled a roller 48, working in a slot 49 in an arm 50, which is hinged to or pivotally connected with the carrier 31 at the upper edge of the latter on the side facing the chain.

The carrier 31 has an arm or bracket 51 suitably secured thereto and extending in an upward and forward direction, its upper end being provided with or shaped to form a horizontal forwardly-extending pin 52, upon which may be journaled a roller 53, adapted to engage with the flanges 29 30 upon the rear side of the tank 18 to tilt the latter when the carrier descends and to restore it to a horizontal position as the carrier starts in an upward direction.

54 designates a sleeve secured, by means of a set-screw 55, upon the column 1 a short distance below the casting 40 and having a rearward-extending arm 56, to the outer end of which is attached a hoop or band 57, which serves to support the pan or tank 58, into which the cream is discharged by the carrier-bucket when the latter reaches the upper limit of its movement. The tank 58 has at its upper edge an outwardly-extending circumferential flange 59, adapted to rest upon the upper edge of the hoop or band 57, within which the said tank is thus supported. This tank also has an inward-extending flange 60 to prevent the cream from splashing over, and it is provided with a discharge-pipe 61, which may be connected with a suitable conduit to conduct the cream to its eventual point of destination. The upper end of the guide-rod 5 is curved to the form of a gooseneck 62, which is connected by a bolt or rivet with the hoop or band 57, thus causing these parts to mutually support each other.

The shaft 42, journaled in the casting 40 at the upper end of column 1, extends beyond said casting at the end opposite to that carrying the sprocket-wheel 44 and carries the pulleys 63 and 64, one of which is loose and the other fixed upon the shaft, to which motion may thus be transmitted by a belt or band 65 from any suitable source of power. A belt-shifting device of ordinary construction (indicated in the drawings by 66) is attached to the arm 56 of sleeve 54 for the purpose of throwing the device into or out of operation, as required.

In operation motion is transmitted to the shaft 42, carrying the sprocket-wheel 44, so as to impart motion to the endless chain driven by said sprocket-wheel. When the link of said chain having the pin 47 descends, the carrier supported upon said pin by the slotted arm 50 slides downwardly upon the track-bar 4. As it approaches the lower limit of its movement the roller 53, journaled upon the pin projecting from the bracket 51 of said carrier, engages the lower flange 29 upon the rear side of the tank 18, thus gradually tilting the latter, a too-sudden tilting being prevented by the flange 30 coming into contact with the upper side of the roller. When the carrier reaches the extreme lower limit of its movement upon the track-bar 4, it remains stationary while the link having the pin 47 makes the circuit of the lower part of the sprocket 14, the roller 48 traveling in the slot 49 of the arm 50, which latter as the pin 47 ascends swings upon its hinge or pivot to follow the movement. While this takes place, the carrier, with the elevator-bucket, remains stationary for a length of time sufficient to enable the tank 18 to practically empty its contents into the said elevator-bucket. It will be observed that the flow of cream through the pipe 24 into the receiving-tank does not require to be checked while the latter is tilted, the said pipe being so arranged that its discharge end shall be directly over the uncovered portion of said tank, whether it be tilted or in its normal horizontal position. When the chain-link having the pin 47 ascends, the carrier supported upon the said pin moves upward upon the track-bar 4. When the upper limit of the movement is approached, the gooseneck 62 of the guide-bar 5, by engaging and arresting the rearmost roller 39 upon the bucket 34, causes the latter to be gradually tilted, so as to discharge its contents into the tank 58, remaining in this position, while the link having the pin 47 passes over the sprockets 44 45 and until it begins its descent, when the bucket 34 will be gradually and automatically restored to its normal horizontal position, owing to the excess of weight in its receiving end, a too-sudden movement being prevented by the rear roller 39, which is in engagement with the gooseneck 62 until the bucket is restored to normal position. The carrier now descends and the operation is repeated as before.

By my improved elevator, which, as will be seen, is very simple in construction, the cream may be transferred automatically without attention and without waste. It occupies but little space and when not in use may be readily divested of the tanks and bucket for the necessary cleansing of these. By properly regulating the speed there will be no danger of the receiving-tank overflowing at any time. As regards dimensions, I consider that the receiving-tank and carrying-bucket should be made of a capacity of from twenty to twenty-four pounds of cream each; but this, of course, may be varied at the option of the manufacturer.

The device is so constructed that it may be readily installed in any creamery without regard to local conditions, no special construction of parts being necessary beyond the requisite lengthening or shortening of the chain and the upright parts of the device. It will be seen that the receiving-tank 18, being mounted upon the vertically-adjustable rod 15, may be readily set so as to be tilted at exactly the right moment. The position of the discharge-tank 58 is governed by the length of the guide-bar 5 with the gooseneck, at the upper end of which the supporting-hoop of the said tank is rigidly connected. This insures the tilting of the elevator-bucket for the purpose of discharging its contents into the tank 58 at exactly the right time.

While my invention is primarily designed as a cream-elevator, it is obvious that it may be advantageously used for other purposes without departing from the spirit of my invention.

Having thus described my invention, I claim and desire to secure by Letters Patent of the United States—

1. The combination of a column or upright, a sleeve mounted upon the same near its lower end, a rod vertically adjustable in said sleeve and having a laterally-extending arm, a tank mounted tiltingly upon said arm and having excess of weight in its receiving end, and means for supporting the said tank normally in an approximately horizontal position, substantially as set forth.

2. The combination with the supporting-arm extending laterally from a vertically-adjustable rod, of the receiving-tank, a tubular bearing secured transversely across the bottom of said tank whereby it is mounted tiltingly upon the supporting-arm, and means secured to the vertically-adjustable rod for supporting the tank normally in approximately horizontal position, substantially as set forth.

3. The tilting receiving-tank having on its rear side a pair of parallel horizontal flanges, the lower extending beyond the upper of said flanges, in combination with the vertically-reciprocating carrier, a bracket attached to said carrier, a roller journaled to said bracket and adapted to engage the flanges of the tilting tank, means for supporting the tank and carrier, and means for imparting to the latter a vertically-reciprocating motion, substantially as set forth.

4. The combination of the tilting receiving-tank, the vertically-reciprocating carrier, means attached to the latter for operating the receiving-tank, an arm extending laterally from the carrier, the elevator-bucket mounted tiltingly upon the said arm, the discharge-tank located near the upper limit of the movement of the carrier, the guide-rod terminating at its upper end in a gooseneck connected rigidly with the support of the discharge-tank, and suitable supporting and operating means, substantially as set forth.

5. The combination of the vertically-reciprocating carrier, an arm extending laterally from the same, the elevator-bucket mounted tiltingly upon said arm and having excess of weight in its receiving end, the rollers journaled upon pins extending laterally from said bucket, one below and in rear of the other, the vertical guide-rod engaging between said rollers and terminating in a gooseneck at its upper end, the tilting receiving-tank, the discharge-tank, a supporting-hoop for the latter, a rigid connection between said supporting-hoop and the gooseneck at the upper end of the guide-rod, and suitable supporting and operating means, substantially as and for the purpose set forth.

In testimony whereof I have affixed my signature in presence of two witnesses.

ANDERS P. LAURSEN.

Witnesses:
L. A. CHRISTENSEN,
SOREN HANSEN.